(12) United States Patent
Krasner et al.

(10) Patent No.: US 11,972,112 B1
(45) Date of Patent: Apr. 30, 2024

(54) HOST IO DEVICE DIRECT READ OPERATIONS ON PEER MEMORY OVER A PCIe NON-TRANSPARENT BRIDGE

(71) Applicant: Dell Products, L.P., Hopkinton, MA (US)

(72) Inventors: Jonathan Krasner, Coventry, RI (US); Ro Monserrat, Medfield, MA (US); Michael Scharland, Franklin, MA (US); Jerome Cartmell, Millis, MA (US); James M Guyer, Northboro, MA (US); Scott Rowlands, Cumming, GA (US); Julie Zhivich, Westborough, MA (US); Thomas Mackintosh, Boston, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/160,616

(22) Filed: Jan. 27, 2023

(51) Int. Cl.
| | | |
|---|---|---|
| *G06F 12/00* | (2006.01) | |
| *G06F 3/06* | (2006.01) | |
| *G06F 12/02* | (2006.01) | |
| *G06F 13/28* | (2006.01) | |

(52) U.S. Cl.
CPC .......... *G06F 3/0613* (2013.01); *G06F 3/0659* (2013.01); *G06F 3/0673* (2013.01); *G06F 12/02* (2013.01); *G06F 13/28* (2013.01)

(58) Field of Classification Search
CPC .... G06F 3/0613; G06F 3/0659; G06F 3/0673; G06F 13/4221; G06F 12/02; G06F 13/4027; G06F 13/4045
See application file for complete search history.

(56) References Cited

U.S. PATENT DOCUMENTS

| | | | |
|---|---|---|---|
| 7,979,592 B1 * | 7/2011 | Pettey | G06F 13/404 |
| | | | 709/205 |
| 11,537,313 B1 | 12/2022 | Duquette et al. | |
| 2015/0074320 A1 * | 3/2015 | Galles | H04L 61/2514 |
| | | | 710/313 |
| 2017/0351639 A1 * | 12/2017 | Borikar | G06F 15/17331 |
| 2018/0101494 A1 * | 4/2018 | Davis | G06F 13/105 |
| 2022/0350755 A1 * | 11/2022 | Hahn | G06F 13/4295 |
| 2023/0176993 A1 * | 6/2023 | Thomas | G06F 13/4282 |
| | | | 710/105 |

* cited by examiner

*Primary Examiner* — John A Lane
(74) *Attorney, Agent, or Firm* — Anderson Gorecki LLP (57) ABSTRACT

A host IO devices directly implements host read operations on both local memory, and on peer memory via a PCIe non-transparent bridge. When a host read operation is received by a host IO device from a host, the host IO device uses an API to obtain the physical address of the requested data on the peer memory, and generates a PCIe Transaction Layer Packet (TLP) addressed to the address in the peer memory. The TLP addressed to an address in the peer memory is passed over the NTB to the peer compute node to retrieve the data stored in the addressed slot of peer memory. The requested data is returned to the host IO device over the NTB, stored in a buffer, and read out to the host to directy respond to the host read operation.

15 Claims, 6 Drawing Sheets

FIG. 4
Host cut-through read from peer

FIG. 5
Host Read – Old process

FIG. 6
Host Read – New process

HOST IO DEVICE DIRECT READ OPERATIONS ON PEER MEMORY OVER A PCIe NON-TRANSPARENT BRIDGE

FIELD

This disclosure relates to computing systems and related devices and methods, and, more particularly, to a method and apparatus implementing host IO device direct read operations on peer memory over a PCIe non-transparent bridge.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method and apparatus for implementing host IO device direct read operations on peer memory over PCIe non-transparent bridge is provided. When a host read operation is received by a host IO device from a host, the host IO device implements a direct read either from local memory or peer memory. For host read operations on peer memory, the host IO device uses an API to obtain the physical address of the requested data on the peer memory, and generates a PCIe Transaction Layer Packet (TLP) addressed to the address in the peer memory. When the PCIe switch driver receives a TLP addressed to an address in the peer memory, the PCIe switch driver (firmware) passes the read request over the NTB to the peer compute node to retrieve the data stored in the addressed slot of peer memory. The requested data is returned to the host IO device, stored in a buffer, and read out by the host IO device to the host, to respond to the host read operation.

In some embodiments, a method of implementing read operations on a storage engine having two compute nodes, each compute node having a separate PCIe root complex and a memory connected to the PCIe root complex, the two root complexes being interconnected by a non-transparent bridge, includes receiving a host read operation by a host IO device on one of the compute nodes, the one of the compute nodes being a local compute node to the host IO device, and determining a physical address for the host read operation, the physical address for the host read operation being a local memory address of the memory connected to the PCI root complex of the local compute node or being a peer memory address of the memory connected to the PCIe root complex of the peer compute node. In response to a determination that the physical address is the local memory address, generating a transaction layer packet addressed to the address in local memory and directly implementing the read operation from the local memory. In response to a determination that the physical address is the peer memory address, generating a transaction layer packet addressed to the address in peer memory, forwarding the transaction layer packet over the non-transparent bridge to the PCIe root complex of the peer compute node, and directly implementing the read operation from the peer memory.

In some embodiments, a system for implementing read operations on a storage engine having two compute nodes, each compute node having a separate PCIe root complex and a memory connected to the PCIe root complex, the two root complexes being interconnected by a non-transparent bridge is provided. The system includes one or more computers and one or more storage devices storing instructions that are operable, when executed by the one or more computers, to cause the one or more computers to perform operations including receiving a host read operation by a host IO device on one of the compute nodes, the one of the compute nodes being a local compute node to the host IO device, and determining a physical address for the host read operation, the physical address for the host read operation being a local memory address of the memory connected to the PCI root complex of the local compute node or being a peer memory address of the memory connected to the PCIe root complex of the peer compute node. In response to a determination that the physical address is the local memory address, the instructions are further operable to cause the one or more computers to perform operations including generating a transaction layer packet addressed to the address in local memory and directly implementing the read operation from the local memory. In response to a determination that the physical address is the peer memory address, the instructions are further operable to cause the one or more computers to perform operations including generating a transaction layer packet addressed to the address in peer memory, forwarding the transaction layer packet over the non-transparent bridge to the PCIe root complex of the peer compute node, and directly implementing the read operation from the peer memory.

In some embodiments, a storage engine, includes two compute nodes, each compute node having a separate PCIe root complex and a memory connected to the PCIe root complex, the two root complexes being interconnected by a non-transparent bridge. The storage engine also includes one or more processors and one or more storage devices storing instructions that are operable, when executed by the one or more processors, to enable each compute node to implement direct read operations on the memory of the other compute node over the non-transparent bridge. In some embodiments, the instructions are operable to cause the one or more computers to perform operations including receiving a host read operation by a host IO device on one of the compute nodes, the one of the compute nodes being a local compute node to the host IO device, and determining a physical address for the host read operation, the physical address for the host read operation being a local memory address of the memory connected to the PCI root complex of the local compute node or being a peer memory address of the memory connected to the PCIe root complex of the peer compute node. In response to a determination that the physical address is the local memory address, the instructions are further operable to cause the one or more computers to perform operations including generating a transaction layer packet addressed to the address in local memory and directly implementing the read operation from the local memory. In response to a determination that the physical address is the peer memory address, the instructions are further operable to cause the one or more computers to perform operations including generating a transaction layer packet addressed to the address in peer memory, forwarding the transaction layer packet over the non-transparent bridge to the PCIe root complex of the peer compute node, and directly implementing the read operation from the peer memory.

In some embodiments, directly implementing the read operation from the peer memory comprises forwarding data from the physical address in peer memory to the host IO device over the non-transparent bridge, temporarily storing the data in a buffer in the host IO device, and reading the data out of the buffer, by the host IO device, to the host.

In some embodiments, the host IO device is an electrical component that is configured to be physically connected to physical communication links, and contains electrical components configured to initially receive and process host read operations from hosts over a wired or wireless communication network.

In some embodiments, the host IO device has a host device driver.

In some embodiments, the non-transparent bridge is a PCIe intra-node bridge that enables data transport between the compute nodes implemented using the separate root complexes.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
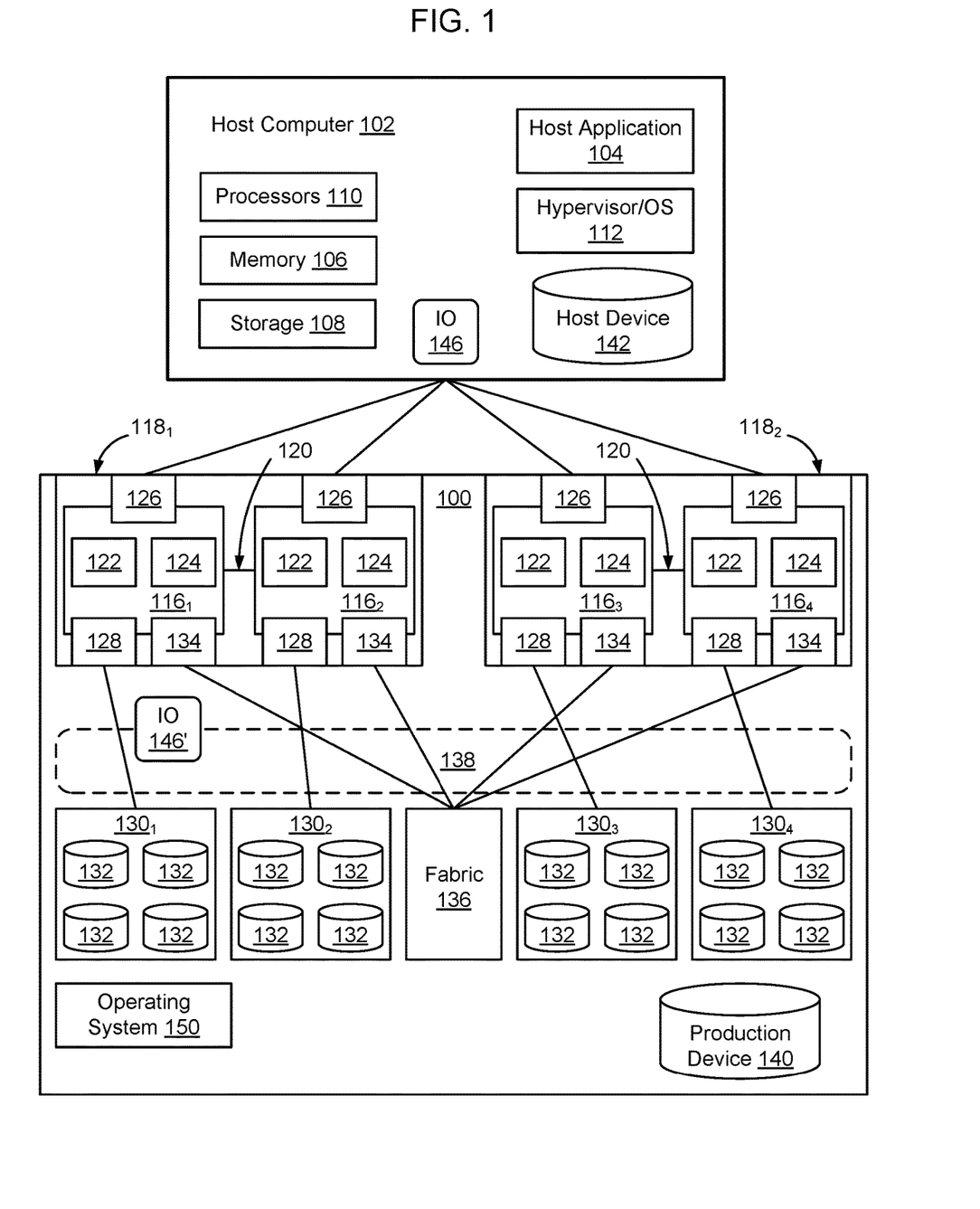
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and Fibre Channel drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared memory 138 that can be accessed by other compute nodes 116, e.g., via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Figure 2:
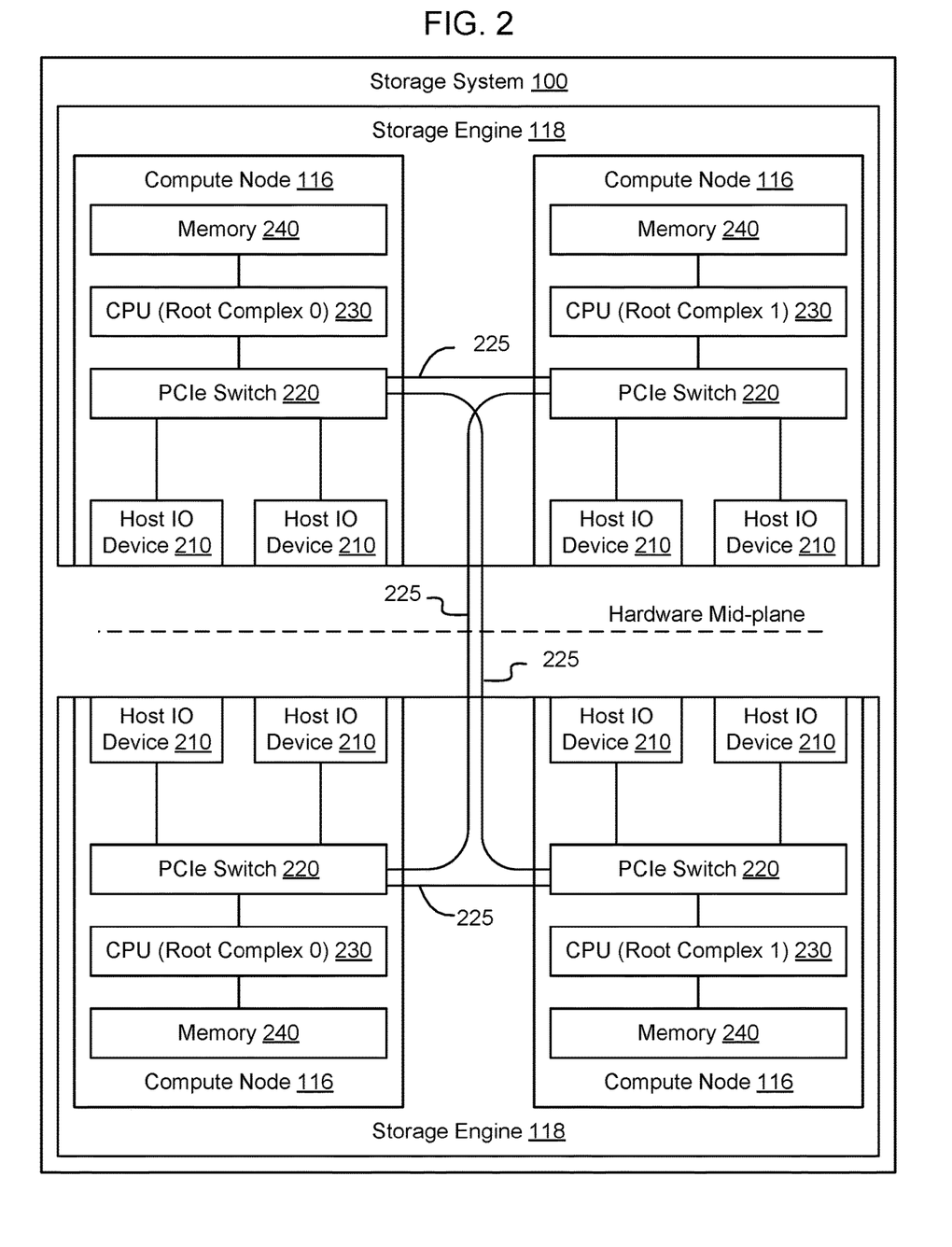
FIG. 2 is a functional block diagram an example storage system having two storage engines, each storage engine having a pair of compute nodes with separate PCIe root complexes, interconnected with a set of PCIe non-transparent bridges, according to some embodiments.

FIG. 2 is a functional block diagram an example storage system 100 having two storage engines 118, each storage engine 118 having a pair of compute nodes 116 with separate PCIe root complexes 230 (root complex 0 and root complex 1), interconnected with a set of one or more PCIe non-transparent bridges 225, according to some embodiments.

As shown in FIG. 2, in some embodiments the storage system 100 has multiple storage engines 118 that are implemented as physically separate boards within the storage system 100, with separate power subsystems. The storage engines 118 may be connected to the storage system 100 at a hardware midplane. In some embodiments, the compute nodes 116 of each storage engine 118 are connected using NTBs 225. A given NTB may have multiple NTB links. Additionally, multiple NTBs 225 may be used to interconnect the compute nodes 116 of the storage engines 118 of a given storage system 100. Although FIG. 2 shows an example storage system having two storage engines 118 for ease of illustration, it should be understood that the storage system 100 may have multiple storage engines 118. Likewise, although FIG. 2 shows an example storage system 100 in which each storage engine 118 has two compute nodes 116, it should be understood that a given storage engine 118 may have more than two compute nodes 116 depending on the implementation.

Figure 4:
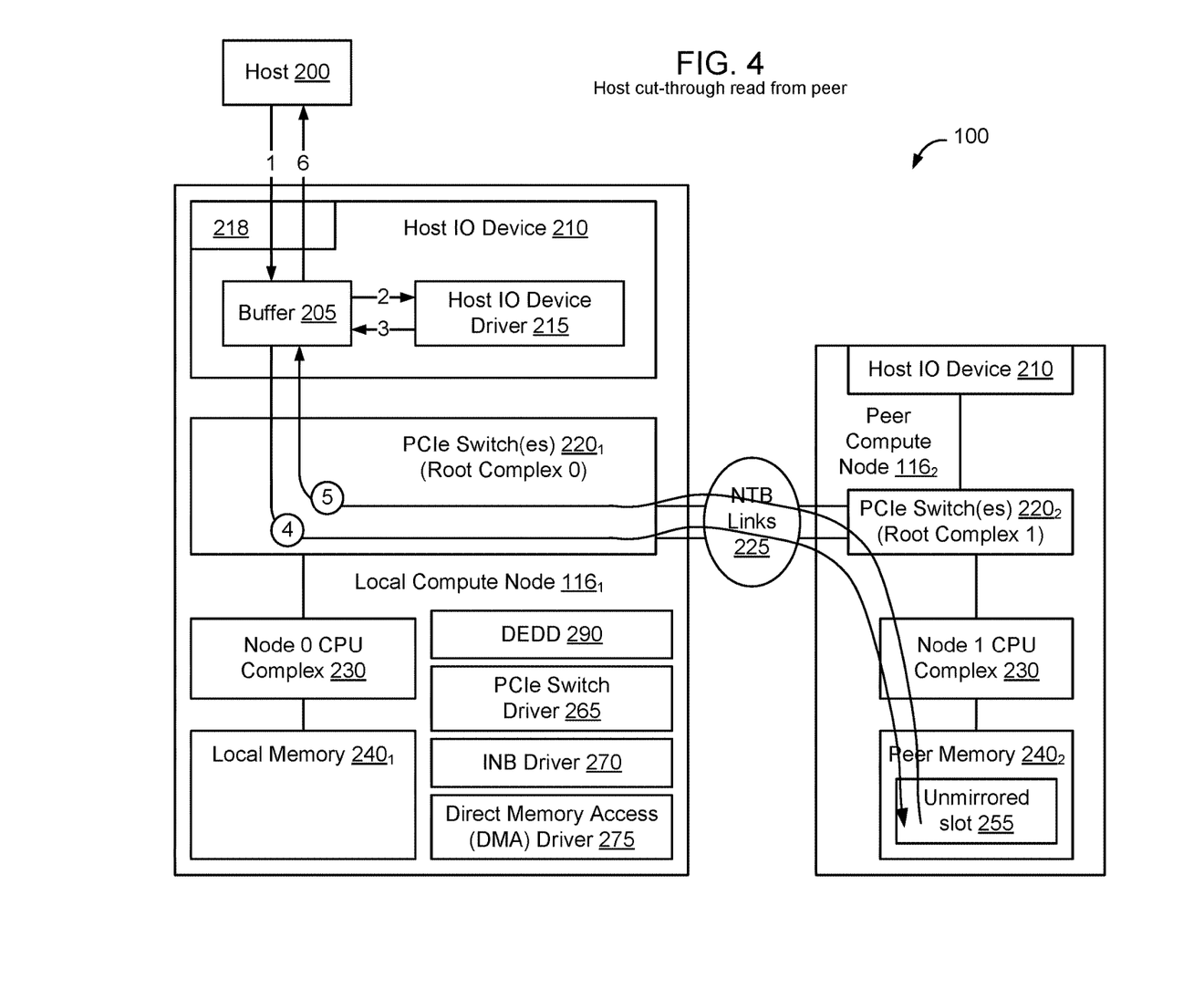
FIG. 4 is a functional block diagram of a pair of compute nodes with separate PCIe root complexes interconnected by a PCIe non-transparent bridge in greater detail, and showing implementation of a direct host read operation by a host IO device over the PCIe non-transparent bridge, according to some embodiments.

As shown in FIG. 2, and as shown in more detail in FIG. 4, in some embodiments each compute node 116 includes a set of host IO devices 210. A Host IO device 210, in some embodiments, is an electrical component that is configured to be physically connected to physical communication links (wired or wireless) via a host IO interface 218, and contains electrical components configured to initially receive and process host read operations from hosts over a wired or wireless communication network. An example host IO device 210 may be implemented as SmalL I/O Card (SLIC) device that is designed to be a hot pluggable IO module that is able to be used with any IO technology, although other physical components may be utilized as well depending on the particular implementation. Each host IO device 210 has a host IO device driver 215. The host IO device driver 215, in some embodiments, is specific to the IO device and IO technology. For example, in embodiments where the IO technology is Fibre Channel, the host IO device 210 will include a host IO device driver implemented as a Fibre Channel driver that manages host IO operations on the host IO device 210 and controls operation of the host IO device 210. When other IO technologies are used, the host IO device driver 215 will be implemented to interoperate using the intended IO technology. In some embodiments, the host IO devices 210 are electrical components that are physically connected to physical communication links such as Ethernet wires, fiber optic cables, or wireless communication mediums, and are configured to be components that initially receive and process host read operations from hosts over a wired or wireless communication network.

The host IO devices 210 receive host IO read and write operations from hosts 102, and hardware and firmware of the host IO devices 210 manage the host IO read and write operations on local memory $240_1$ and peer memory $240_2$. For host read operations, the host IO device 210 uses an API to obtain the physical address of the requested data, and implements a direct read of the requested data either from local memory $240_1$ or from peer memory $240_2$ over the PCIe switch 220 to obtain the requested data and respond to the host read operation. For host write operations, the host IO device 210 translates the destination address of the host write operation to a dual-cast region of the PCIe switch 220 and sends the write operation to the PCIe switch 220. Additional details associated with implementing host write operations are contained in U.S. Pat. No. 11,537,313, the content of which is hereby incorporated herein by reference.

As shown in FIG. 2, in some embodiments each compute node 116 of a given storage engine 118 has a separate PCIe root complex 230. The host IO devices 210 can connect directly to the PCIe root complex or, optionally, a PCIe switch 220 interconnects host IO devices 210 with the root complex 230. Each compute node 116 also includes memory 240 that is also connected to the root complex 230. In some embodiments, the root complex is a device that connects the CPU and memory subsystem to the PCI Express switch fabric, which is composed of one or more PCIe or PCI devices. The root complex 230 may be a separate physical component from the CPU, or the functionality of the root complex 230 may be integrated into the chipset/CPU, depending on the implementation.

As shown in FIG. 2, the PCIe root complexes 230 on separate compute nodes $116_1$, $116_2$, of a storage engine 118 are interconnected using a Non-Transparent Bridge 225. The Non-Transparent Bridge (NTB) 225 is a PCIe intra-node bridge that enables data transport between compute nodes $116_1$, $116_2$, implemented using different root complexes 230. In some embodiments, the NTB 225 is the data transport used by software to obtain locks on the peer memory $240_2$ in connection with direct read operations on the peer memory $240_2$. The CPU root complex can implement the functionality of the NTB 225 or, optionally, the NTB 225 can be implemented by PCIe switch 220. Accordingly, although FIG. 2 shows NTB 225 extending between the PCIe switches 220 of the compute nodes 116, and the description provides an example in which the direct read operations are implemented over a NTB that is implemented by the CPIe switch 220, it should be understood that the NTB 225 can also extend between the CPU root complexes 230, and that the direct read operations can accordingly be implemented via the NTB 225 through the root complexes 230, depending on the particular implementation.

In some embodiments, the firmware of the PCIe switch $220_1$ on the local compute node $116_1$ is programmed during enumeration to recognize the peer memory $240_2$ as connected to the PCIe switch $220_1$ on the NTB 225. Any PCIe Transaction Layer Packet (TLP) addressed to an address on peer memory $240_2$ is passed by the PCIe switch 220 over the NTB 225 to enable the host IO device 210 to implement direct read operations on the peer memory $240_2$ of the peer compute node $116_2$. Accordingly, in some embodiments the host IO device 210 is able to directly address read operations to peer memory $240_2$ using the same process that the host IO device 210 uses to directly address read operations to local memory $240_1$. All read operations on peer memory $240_2$ are transmitted by the PCIe switch $220_1$/root complex $230_1$ on the local compute node $116_1$ over the NTB 225 and routed by the PCIe switch $220_2$/root complex $230_2$ on the peer compute node $116_2$ to attached peer memory $240_2$.

Figure 3:
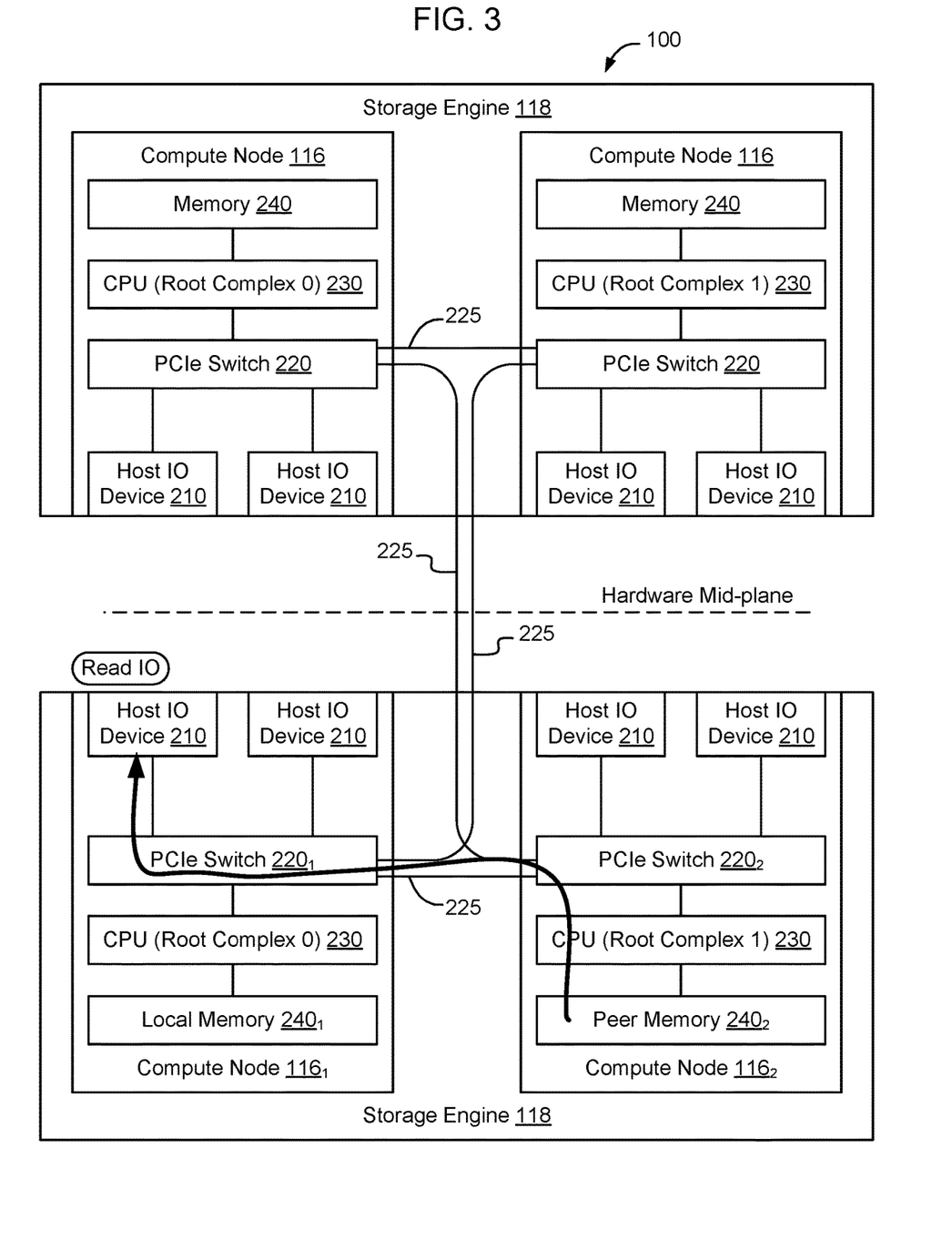
FIG. 3 is a functional block diagram of the example storage system of FIG. 2 showing implementation of a direct read operation by a host IO device on peer memory over the PCIe non-transparent bridge, according to some embodiments.

FIG. 3 is a functional block diagram of the example storage system of FIG. 2 showing implementation of a direct read operation by a host IO device on peer memory over the PCIe Non-Transparent Bridge (NTB) 225, according to some embodiments. FIG. 4 is a functional block diagram of a pair of compute nodes 116 with separate PCIe root complexes 230 interconnected by a PCIe NTB 225 in greater detail, and showing implementation of a direct host read operation by a host IO device 210 over the PCIe NTB 225, according to some embodiments. In FIGS. 3 and 4, the peer compute node $116_2$ is shown as being on the same storage engine 118 as the local storage engine $116_1$. It should be understood that in some embodiments the host IO device 210 is able to implement direct read operations on peer memory 240 that is located on a compute node 116 on a different storage engine 118 depending on the implementation.

As shown in FIG. 4, when a read operation is received at a host IO interface 218 of a host IO device 210 (arrow 1), the host IO device driver 215 is used to resolve an address of the requested data (arrows 2 and 3). For example, in some embodiments, the host IO device driver 215 determines the physical address of the requested data, which might be an address where the data resides in local memory $240_1$ on local compute node $116_1$, an address where the data resides in peer memory $240_2$ on the peer compute node $116_2$, or and address where the data resides in shared virtual memory 240 on a compute node 116 in another storage engine 118.

When the host IO device driver 215 determines that the data resides in local memory $240_1$, the host IO device 210 retrieves the data from local memory $240_1$, temporarily stores the retrieved data in buffer 205, and forwards the requested data to host 200 over host IO interface 218. When the host IO device driver 215 determines that the read request is for data contained in peer memory $240_2$, the host IO device driver 215 generates a PCIe Transaction Layer Packet (TLP) addressed to an address in the peer memory $240_2$, (arrow 4). When the PCIe switch driver 265 receives a TLP addressed to an address in the peer memory $240_2$, the PCIe switch driver 265 (firmware) passes the read request over the NTB 225 to the peer compute node $116_2$ to retrieve the data stored in the addressed slot of peer memory $240_2$. The read operation is implemented on peer memory $240_2$, and the requested data is returned directly to the host IO device 210 (arrow 5). The requested data is temporarily stored in a buffer 205 on the host IO device 210, and forwarded by the host IO device 210 to the host 200 over host IO interfaced 218 (arrow 6) to complete the read operation.

Figure 5:
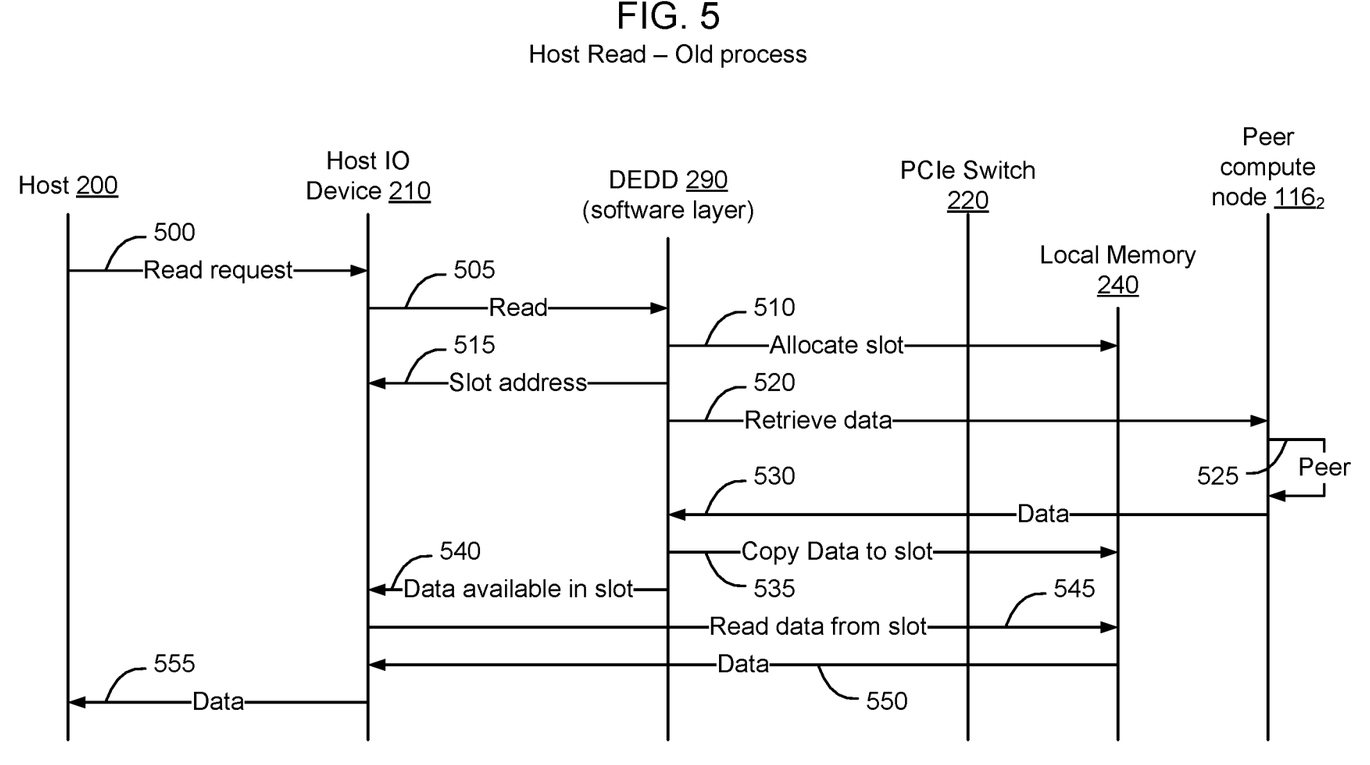
FIG. 5 is a swim lane diagram showing a conventional host read operation on a storage engine having a pair of compute nodes.

FIG. 5 is a swim lane diagram showing a conventional host read operation on a storage engine 118 having a pair of compute nodes 116. As shown in FIG. 5, conventionally when a read request is received that requires data to be read from a slot of peer memory $240_2$ (arrow 500), the host IO device 210 would pass the read operation to Data Engine Device Driver (DEDD) 290, to instruct the DEDD 290 to organize the read operation (arrow 505). The DEDD 290, in some embodiments, is a software engine that sets up data transfers that get processed by three low level drivers—a PCIe switch driver 265, an NTB driver 270, and a Direct Memory Access (DMA) driver 275. In response to the read operation, the DEDD 290 would allocate a slot in local memory $240_1$ (arrow 510) and provide the address of the allocated slot in local memory $240_1$ to the host IO device 210 (arrow 515).

The DEDD 290 would then request the data from the peer compute node $116_2$ (arrow 520). The peer compute node $116_2$ would retrieve the requested data from peer memory $240_2$ (arrow 525) and provide the requested data to the DEDD 290 (arrow 530). The DEDD 290 would cause the returned data to be copied to the allocated slot in local memory $240_1$ (arrow 535) and notify the host IO device 210 that the data is available in the allocated slot of local memory $240_1$ (arrow 540). The host IO device 210 would then read the data from the allocated slot of local memory $240_1$ (arrow 545). When the host IO device received the data (arrow 550) the host IO device 210 would read the data out to the host 200 (arrow 555) to complete the read operation from the peer memory $240_2$. Accordingly, as shown in FIG. 5, implementing read operations from peer memory $240_2$ conventionally required use of a slot of local memory $240_1$, which means that the allocated slot could not be used for other purposes during the pendency of the read operation. Further, the read operations would conventionally be implemented using DEDD 290 and/or Direct Memory Access (DMA) driver 275, which required coordination of components of the compute nodes $116_1$ in addition to the host IO device 210 to implement the read operation on peer memory $240_2$.

Figure 6:
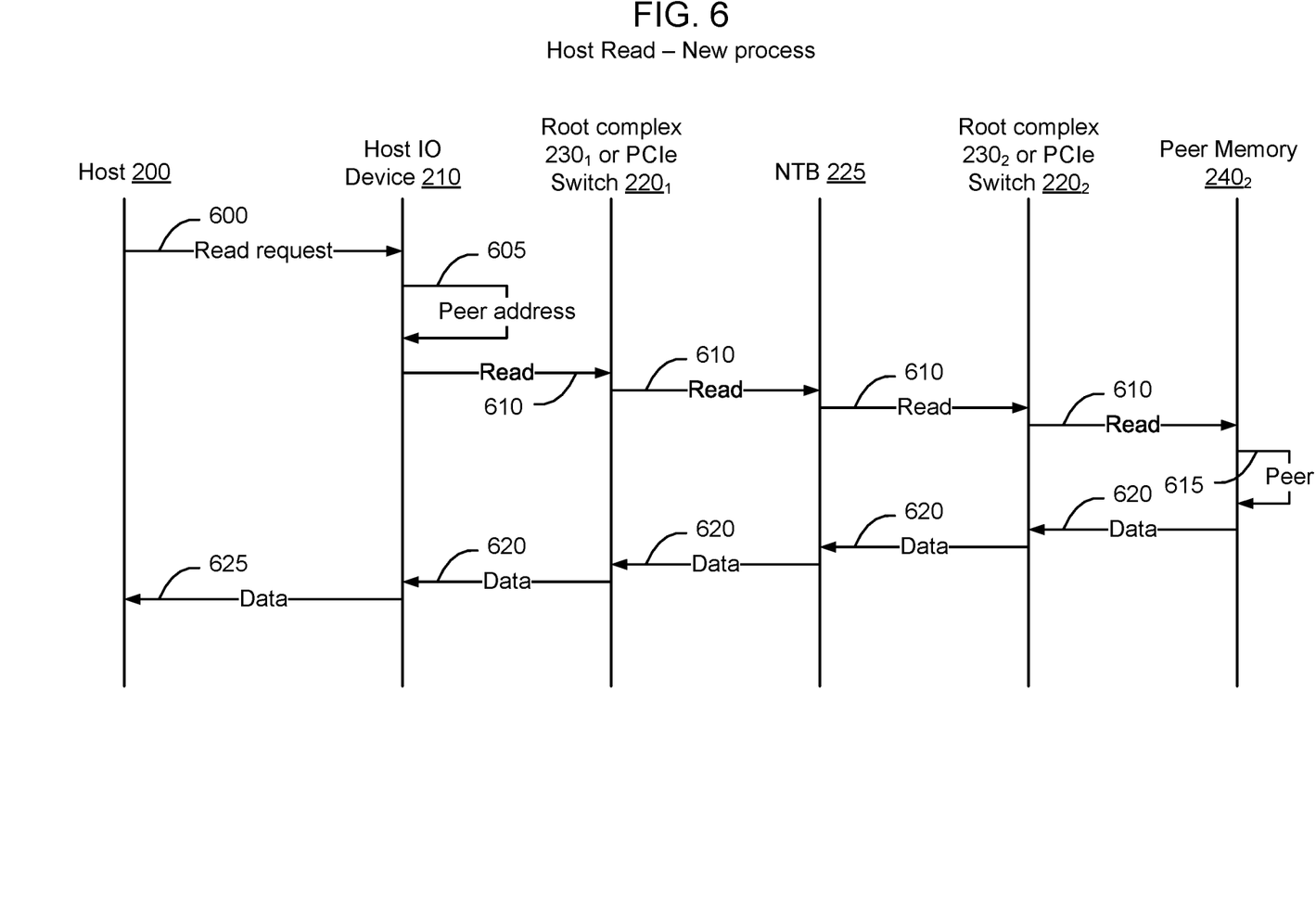
FIG. 6 is a swim lane diagram showing a host read operation on a storage engine having a pair of compute nodes with separate PCIe root complexes, interconnected with a PCIe non-transparent bridge, and showing implementing host IO device direct read operations on peer memory over a PCIe non-transparent bridge, according to some embodiments.

FIG. 6 is a swim lane diagram showing a host read operation on a storage engine 118 having a pair of compute nodes 116 with separate PCIe root complexes 230, interconnected with a PCIe non-transparent bridge 225, and showing implementing host IO device 210 direct read operations on peer memory $240_2$ over a PCIe non-transparent bridge 225, according to some embodiments. As shown in FIG. 6, according to some embodiments, when a read operation is received by a host IO interface 218 on host IO device 210 (arrow 600), the host IO device driver 215 in the host IO device 210 determines the location of the requested data on the storage system 100. In instances where the host IO device driver 215 determines that the read operation is requesting data stored in a slot of peer memory $240_2$ on the peer compute node $116_2$, host IO device driver 215 returns the address where the requested data is located on the peer compute node $116_2$ (arrow 605).

The host IO device 210 generates a TLP directed to the address of peer memory $240_2$. In embodiments where the NTB 225 is implemented by the CPU root complex 230, the TLP is sent to the CPU root complex and forwarded by the CPU root complex over the NTB 225 to the peer compute node $116_2$. In embodiments where the NTB 225 is implemented by the PCIe switch $220_1$, the TLP is sent to the PCIe switch $220_1$ and is forwarded by the PCIe switch $220_1$ over the NTB 225. The peer compute node $116_2$ receives the TLP on the NTB 225 and forwards the TLP to peer memory $240_2$ (arrows 610). The read operation is implemented on peer memory $240_2$ (arrow 615), and the requested data is returned via the NTB 225, to the host IO device 210 (arrows 620). The host IO device 210 stores the returned data in buffer 205, and sends the requested data to the host 200 (arrow 625).

By configuring the PCIe switch 220 to enable the host IO devices 210 to implement direct read operations on addresses of peer memory $240_2$, it is possible to implement direct read operations without the use of DEDD 290 or DMA driver 275. This can greatly reduce the amount of time required to implement read operations on peer memory $240_2$, since the DEDD 290 and DMA driver 275 conventionally have often been responsible for a significant proportion of the amount of time required to respond to host read operations. Additionally, since the read operation is able to be implemented directly by the host IO device 210 without requiring a slot of local memory $240_1$ to be allocated on the local compute node $116_1$, implementing read operations on the peer memory $240_2$ of the peer compute node $116_2$ does not consume slots of local memory $240_1$ on the local compute node $116_1$. This enables the slots of local memory $240_1$ on the local compute node $116_1$ to be used for other operations, which reduces overall memory requirements associated with responding to host read operations.

Specifically, in some embodiments by forwarding read operations on peer memory $240_2$ by the host IO device 210 to the peer compute node $116_2$ over the NTB 225, it is possible to accelerate processing of read operations by the host IO device 210 and also avoid the use of local memory $240_1$, hence consuming less memory bandwidth, when compared with the conventional process of implementing a read operation on a storage engine 118.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing read operations on a storage engine having two compute nodes, each compute node having a separate PCIe root complex and a memory connected to the PCIe root complex, the two root complexes being interconnected by a non-transparent bridge, comprising:
    receiving a host read operation by a host IO device on one of the compute nodes, the one of the compute nodes being a local compute node to the host IO device;
    determining a physical address for the host read operation, the physical address for the host read operation being a local memory address of the memory connected to the PCI root complex of the local compute node or being a peer memory address of the memory connected to the PCIe root complex of the peer compute node;
    in response to a determination that the physical address is the local memory address, generating a transaction layer packet addressed to the address in local memory and directly implementing the read operation from the local memory; and
    in response to a determination that the physical address is the peer memory address, generating a transaction layer packet addressed to the address in peer memory, forwarding the transaction layer packet over the non-transparent bridge to the PCIe root complex of the peer compute node, and directly implementing the read operation from the peer memory.

2. The method of claim 1, wherein directly implementing the read operation from the peer memory comprises forwarding data from the physical address in peer memory to the host IO device over the non-transparent bridge, temporarily storing the data in a buffer in the host IO device, and reading the data out of the buffer, by the host IO device, to the host.

3. The method of claim 1, wherein the host IO device is an electrical component that is configured to be physically connected to physical communication links, and contains electrical components configured to initially receive and process host read operations from hosts over a wired or wireless communication network.

4. The method of claim 1, wherein the host IO device has a host device driver.

5. The method of claim 1, wherein the non-transparent bridge is a PCIe intra-node bridge that enables data transport between the compute nodes implemented using the separate root complexes.

6. A system for implementing read operations on a storage engine having two compute nodes, each compute node having a separate PCIe root complex and a memory connected to the PCIe root complex, the two root complexes being interconnected by a non-transparent bridge, comprising:
    one or more computers and one or more storage devices storing instructions that are operable, when executed by the one or more computers, to cause the one or more computers to perform operations comprising:
    receiving a host read operation by a host IO device on one of the compute nodes, the one of the compute nodes being a local compute node to the host IO device;
    determining a physical address for the host read operation, the physical address for the host read operation being a local memory address of the memory connected to the PCI root complex of the local compute node or being a peer memory address of the memory connected to the PCIe root complex of the peer compute node;
    in response to a determination that the physical address is the local memory address, generating a transaction layer packet addressed to the address in local memory and directly implementing the read operation from the local memory; and
    in response to a determination that the physical address is the peer memory address, generating a transaction layer packet addressed to the address in peer memory, forwarding the transaction layer packet over the non-transparent bridge to the PCIe root complex of the peer compute node, and directly implementing the read operation from the peer memory.

7. The system of claim 6, wherein directly implementing the read operation from the peer memory comprises forwarding data from the physical address in peer memory to the host IO device over the non-transparent bridge, temporarily storing the data in a buffer in the host IO device, and reading the data out of the buffer, by the host IO device, to the host.

8. The system of claim 6, wherein the host IO device is an electrical component that is configured to be physically connected to physical communication links, and contains electrical components configured to initially receive and process host read operations from hosts over a wired or wireless communication network.

9. The system of claim 6, wherein the host IO device has a host device driver.

10. The system of claim 6, wherein the non-transparent bridge is a PCIe intra-node bridge that enables data transport between the compute nodes implemented using the separate root complexes.

11. A storage engine, comprising:
    two compute nodes, each compute node having a separate PCIe root complex and a memory connected to the PCIe root complex, the two root complexes being interconnected by a non-transparent bridge, comprising:
    one or more processors and one or more storage devices storing instructions that are operable, when executed by the one or more processors, to enable each compute node to implement direct read operations on the memory of the other compute node over the non-transparent bridge, the instructions being operable to cause the one or more computers to perform operations comprising:

receiving a host read operation by a host IO device on one of the compute nodes, the one of the compute nodes being a local compute node to the host IO device;

determining a physical address for the host read operation, the physical address for the host read operation being a local memory address of the memory connected to the PCI root complex of the local compute node or being a peer memory address of the memory connected to the PCIe root complex of the peer compute node;

in response to a determination that the physical address is the local memory address, generating a transaction layer packet addressed to the address in local memory and directly implementing the read operation from the local memory; and in response to a determination that the physical address is the peer memory address, generating a transaction layer packet addressed to the address in peer memory, forwarding the transaction layer packet over the non-transparent bridge to the PCIe root complex of the peer compute node, and directly implementing the read operation from the peer memory.

12. The storage engine of claim 11, wherein directly implementing the read operation from the peer memory comprises forwarding data from the physical address in peer memory to the host IO device over the non-transparent bridge, temporarily storing the data in a buffer in the host IO device, and reading the data out of the buffer, by the host IO device, to the host.

13. The storage engine of claim 11, wherein the host IO device is an electrical component that is configured to be physically connected to physical communication links, and contains electrical components configured to initially receive and process host read operations from hosts over a wired or wireless communication network.

14. The storage engine of claim 11, wherein the host IO device has a host device driver.

15. The storage engine of claim 11, wherein the non-transparent bridge is a PCIe intra-node bridge that enables data transport between the compute nodes implemented using the separate root complexes.

* * * * *